US012475421B2

(12) United States Patent
Shao et al.

(10) Patent No.: US 12,475,421 B2
(45) Date of Patent: Nov. 18, 2025

(54) METHODS AND INTERNET OF THINGS SYSTEMS FOR PROCESSING WORK ORDERS OF GAS PLATFORMS BASED ON SMART GAS OPERATION

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Bin Liu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 204 days.

(21) Appl. No.: 18/331,134

(22) Filed: Jun. 7, 2023

(65) Prior Publication Data

US 2023/0351293 A1   Nov. 2, 2023

(51) Int. Cl.
*G06Q 10/0633* (2023.01)
*G06Q 10/0635* (2023.01)

(52) U.S. Cl.
CPC ..... *G06Q 10/0633* (2013.01); *G06Q 10/0635* (2013.01)

(58) Field of Classification Search
CPC .............. G06Q 10/0633; G06Q 10/0635
See application file for complete search history.

(56) References Cited

U.S. PATENT DOCUMENTS

| | | | | |
|---|---|---|---|---|
| 10,607,187 B2* | 3/2020 | Loi | ............... | G06Q 10/103 |
| 2004/0260668 A1* | 12/2004 | Bradford | ......... | G06Q 10/06311 |
| 2005/0222889 A1* | 10/2005 | Lai | ............... | G06Q 10/06 705/7.41 |
| 2010/0199260 A1* | 8/2010 | Duggal | ............... | H04L 67/02 717/106 |
| 2012/0065944 A1* | 3/2012 | Nielsen | ............... | G06Q 50/06 703/1 |
| 2013/0006718 A1* | 1/2013 | Nielsen | ............ | G06Q 10/06312 705/7.42 |
| 2016/0260048 A1* | 9/2016 | Uerbach | ........ | G06Q 10/063114 |

(Continued)

FOREIGN PATENT DOCUMENTS

CN          108591104 B       11/2019

OTHER PUBLICATIONS

Brionez, Jacob, et al. "Well Oiled Machine: Classifying Machinery Performance Reductions Using Work Order Data." SMU Data Science Review 3.3 (2020): 2. (Year: 2020).*

*Primary Examiner* — Andre D Boyce
(74) *Attorney, Agent, or Firm* — METIS IP LLC

(57) ABSTRACT

The embodiments of the present disclosure provide a method and an Internet of Things system for processing a work order of a gas platform based on smart gas operation. The method includes: obtaining execution data of the gas work order; determining at least one gas problem corresponding to the gas work order and a reference reason of the at least one gas problem based on the execution data; determining a target processing scheme of the gas work order based on the at least one gas problem and the reference reason, and sending the target processing scheme to a user terminal of an executant; in response to that a feedback of the user terminal satisfies a feedback preset condition, improving a risk level of the gas work order and providing an early warning notification.

17 Claims, 6 Drawing Sheets

(56) References Cited

U.S. PATENT DOCUMENTS

| | | | | |
|---|---|---|---|---|
| 2017/0330152 A1* | 11/2017 | Loi | ........................ | G06F 16/256 |
| 2019/0041439 A1* | 2/2019 | Brown | ...................... | G01D 3/08 |
| 2020/0210954 A1* | 7/2020 | Loi | ........................ | G06Q 30/04 |
| 2023/0090297 A1* | 3/2023 | Jadhav | ................ | G05B 19/4184 |
| | | | | 700/100 |
| 2023/0259821 A1* | 8/2023 | Travalini | ............. | G06N 3/0455 |
| | | | | 706/12 |
| 2024/0193034 A1* | 6/2024 | Midgett | ............ | G06Q 10/06316 |

\* cited by examiner

METHODS AND INTERNET OF THINGS SYSTEMS FOR PROCESSING WORK ORDERS OF GAS PLATFORMS BASED ON SMART GAS OPERATION

TECHNICAL FIELD

The present disclosure relates to the field of work order processing, and in particular, to methods and Internet of Things systems for processing work orders of gas platforms based on smart gas operation.

BACKGROUND

With a development of Internet of Things, an Internet of Things system has been integrated into all walks of life, and a combination of the Internet of Things system and a gas industry also provides a convenience for users and enterprises. However, a gas platform in the Internet of Things system usually plays a role of transferring, relaying, and dispatching a work order, but does not play its role in supervising quality of gas work order execution, solving difficult gas work order problems, and other work, which are responsibility of executants of the gas work order and related managers. By manually processing gas work orders, there may be issues such as delayed resolution of gas problems and potential human errors in quality supervision.

Therefore, a method and an Internet of Things system for processing a gas platform work order of the gas platform based on smart gas operation is urgently needed to be provided, which may achieve a purpose of improving the quality of gas work order execution and a gas problem resolution rate by taking up some tasks such as supervising the quality of the gas work order execution and solving difficult problems of the gas work order through the gas platform, and giving suggestions of troubleshooting and processing during an execution process through data collected by the gas platform.

SUMMARY

According to one or more embodiments of the present disclosure, a method for processing a work order of a gas platform based on smart gas operation is provided. The method is executed by a processor of a smart gas management platform of an Internet of Things for processing a work order of a gas platform based on smart gas operation, including: obtaining execution data of the gas work order, wherein the execution data includes at least one of a type of the gas work order, a disposal location of the gas work order, a disposal difficulty of the gas work order, and an executant of the work order; determining at least one gas problem corresponding to the gas work order and a reference reason of the at least one gas problem based on the execution data of the gas work order; determining a target processing scheme of the gas work order based on the at least one gas problem and the reference reason of the at least one gas problem, and sending the target processing scheme to a user terminal of the executant of the gas work order; and In response to that a feedback of the user terminal satisfies a feedback preset condition, improving a risk level of the gas work order and providing an early warning notification.

According to one ore embodiments of the present disclosure, an Internet of Things system for processing the work order of the gas platform based on smart gas operation is provided, including: a smart gas user platform, a smart gas service platform, a smart gas management platform, a smart gas sensor network platform, and a smart gas object platform; the smart gas user platform is configured to obtain the feedback from the user terminal and send the feedback to the smart gas management platform through the smart gas service platform; the smart gas service platform is configured to send the target processing scheme of the gas work order to the smart gas user platform; and the smart gas management platform is configured to obtain execution data of the gas work order, wherein the execution data includes at least one of the type of the gas work order, the disposal location of the gas work order, the disposal difficulty of the gas work order, and the executant of the work order; and determine the at least one gas problem corresponding to the gas work order and the reference reason of the at least one gas problem based on the execution data of the gas work order; determine the target processing scheme of the gas work order based on the at least one gas problem and the reference reason of the at least one gas problem, and sending the target processing scheme to the user terminal of the executant of the gas work order; and in response to that the feedback of the user terminal satisfies the feedback preset condition, improving the risk level of the gas work order and providing t early warning notification.

According to one or more embodiments of the present disclosure, a non-transitory computer-readable storage medium that stores computer instructions is provided. When reading the computer instructions in the storage medium, a computer executes any one of the method for processing a work order of the gas platform based on the smart gas operation of the above embodiments.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

DETAILED DESCRIPTION

Figure 1:
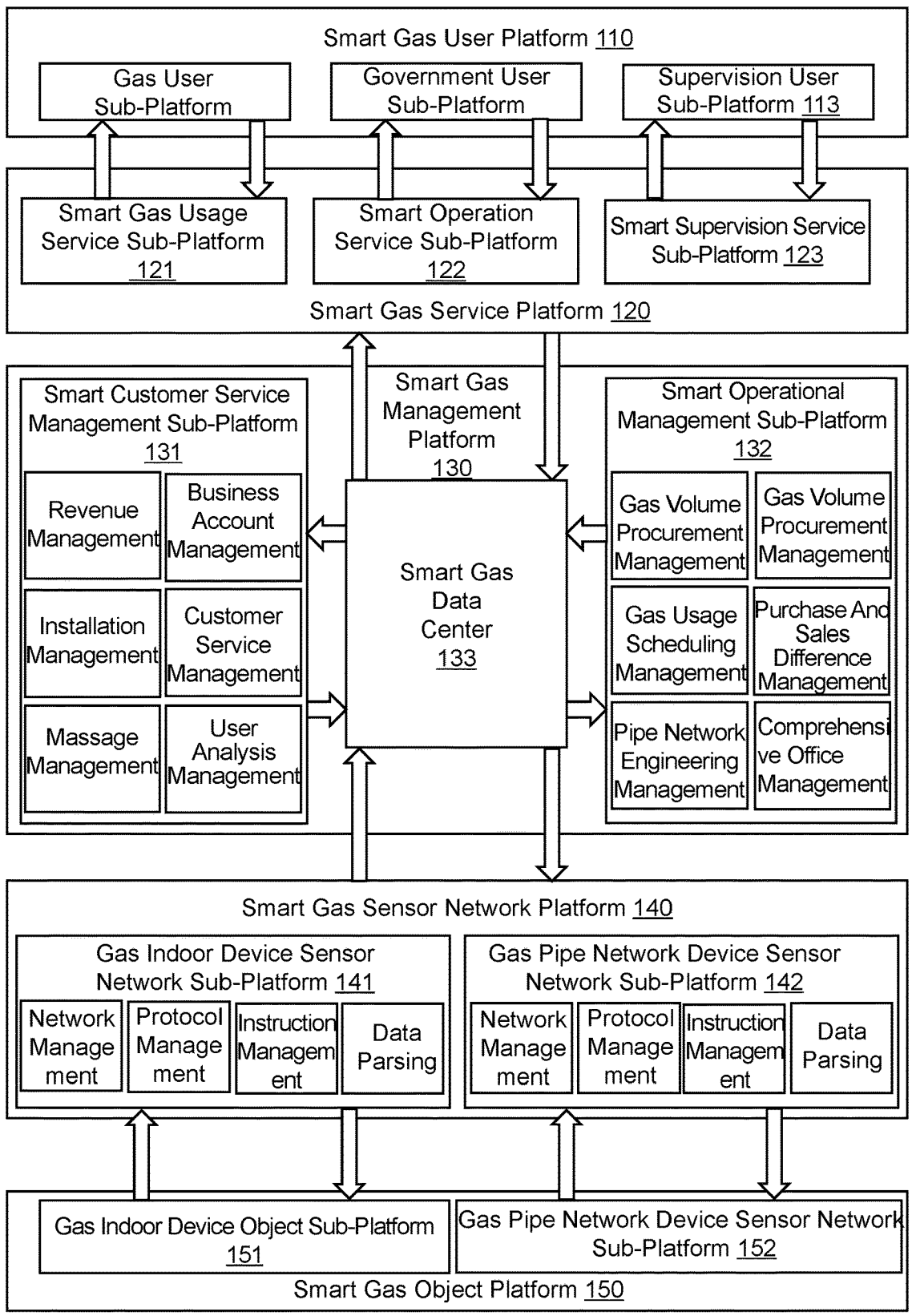
FIG. 1 is a schematic diagram illustrating a platform structure of an Internet of Things for processing a work order of a gas platform based on smart gas operation according to some embodiments of the present disclosure.

In order to more clearly illustrate the technical schemes related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words may be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly determined, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

FIG. 1 is a schematic diagram illustrating a platform structure of an Internet of Things for processing a work order of a gas platform based on smart gas operation according to some embodiments of the present disclosure.

In some embodiments, an Internet of Things system 100 for performing a work order of a gas platform based on smart gas operation may include a smart gas user platform 110, a smart gas service platform 120, a smart gas management platform 130, a smart gas sensor network platform 140, and a smart gas object platform 150.

The smart gas user platform 110 may refer to a platform configured to obtain query instructions (e.g., instructions for querying a processing scheme of a gas work order, etc.), feedback information (e.g., a feedback from a user, an execution feedback from an executant, etc.) of a gas operation user, and transmit related information of the gas work order (e.g., a gas problem and a reference reason of the gas problem, a target processing scheme of the gas work order, etc.) to the user. In some embodiments, the smart gas user platform 110 may be configured as a terminal device, e.g., a cell phone, a tablet, a computer, etc. In some embodiments, the smart gas user platform 110 may interact with the smart gas service platform 120. In some embodiments, the smart gas user platform 110 may issue the query instructions of the gas user and the feedback information to the smart gas service platform 120, and receive the related information of the gas work order uploaded by the smart gas service platform 120.

In some embodiments, the smart gas user platform 110 may include a gas user sub-platform 111, a government user sub-platform 112, and a supervision user sub-platform 113. In some embodiments, the gas user sub-platform 111 may correspond and interact with a smart gas service sub-platform 121 to obtain services of safe gas consumption. The government user sub-platform 112 may correspond and interact with a smart operation service sub-platform 122 to obtain services of gas operation. In some embodiments, a user terminal corresponding to a gas operation user may be configured in the government user sub-platform 112. In some embodiments, the government user sub-platform 112 may issue the query instructions and the feedback information of the gas operation user to the smart operation service sub-platform 122 and receive the related information of the gas work order uploaded by the smart operation service sub-platform 122. In some embodiments, the supervision user sub-platform 113 may correspond and interact with a smart supervision service sub-platform 123 to obtain services of safety supervision needs.

Figure 2:
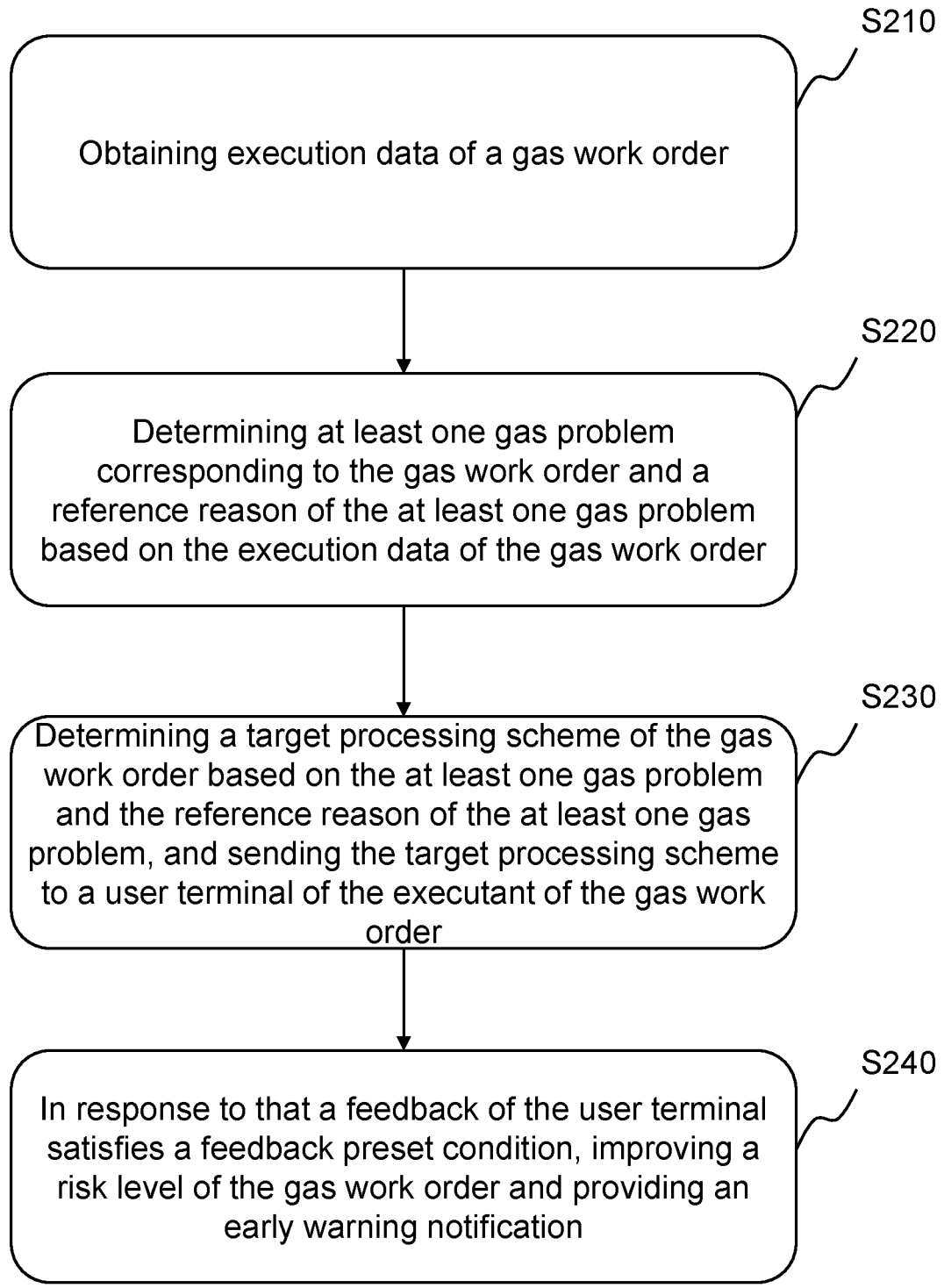
FIG. 2 is a flowchart illustrating an exemplary method for processing a work order of a gas platform based on smart gas operation according to some embodiments of the present disclosure.
Figure 3:
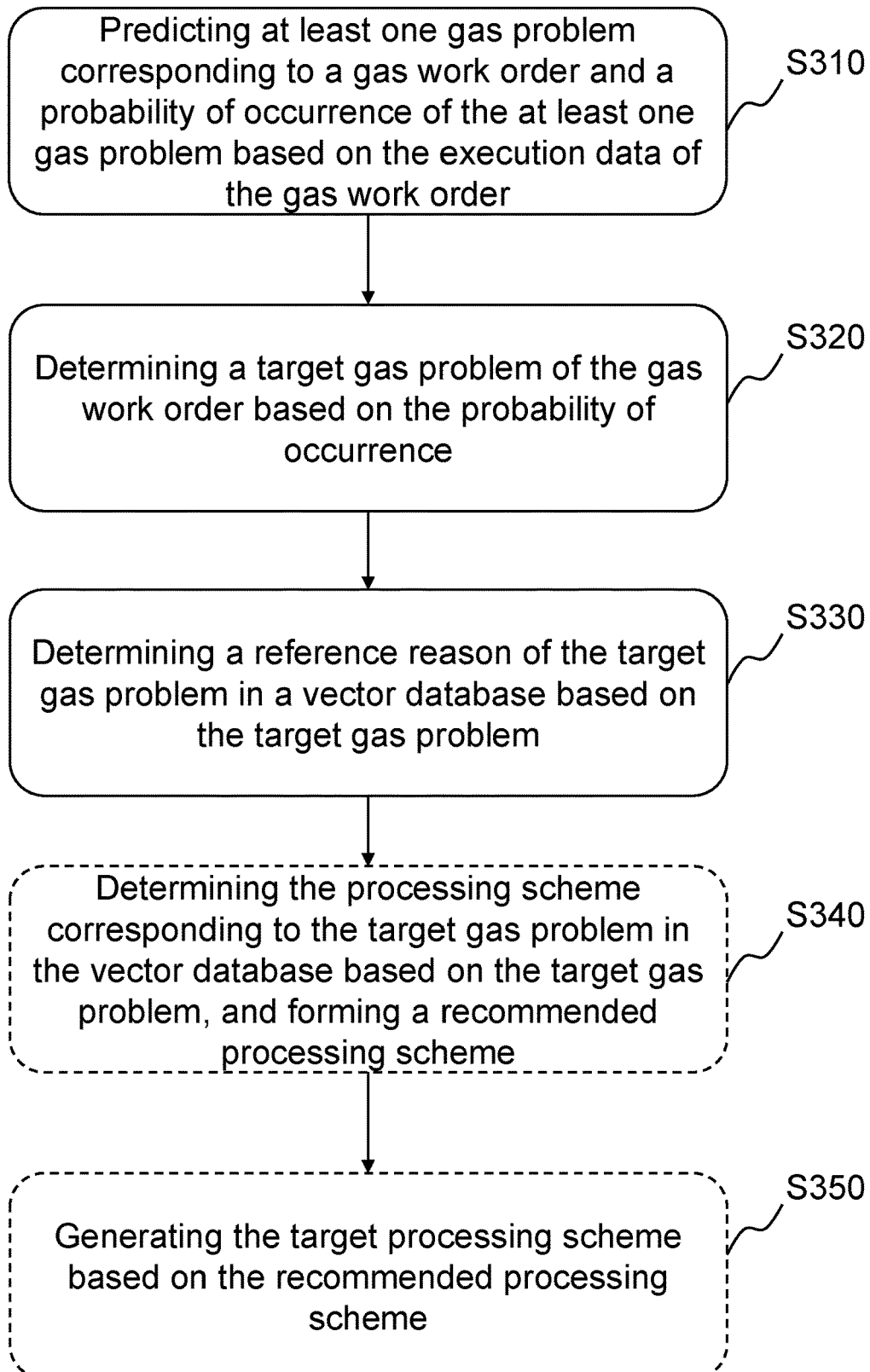
FIG. 3 is an exemplary flowchart illustrating a process for determining at least one gas problem corresponding to a gas work order and a reference reason of the at least one gas problem according to some embodiments of the present disclosure.

More descriptions regarding the feedback from the user, the gas problem and the reference reason of the gas problem, the target processing scheme of the gas work order, and the executant may be found in FIG. 2 and the related descriptions thereof, more descriptions regarding the execution feedback of the executant may be found in FIG. 3 and the related descriptions thereof.

The smart gas service platform 120 may refer to a platform configured to receive and transmit data and/or information such as recommended information, query instructions, troubleshooting schemes, etc.

In some embodiments, the smart gas service platform 120 may include the smart gas service sub-platform 121, the smart operation service sub-platform 122, and the smart supervision service sub-platform 123. In some embodiments, the smart gas service sub-platform 121 may correspond to the gas user sub-platform 111 to provide the gas user with related information of a gas device. The smart operation service sub-platform 122 may correspond to the smart operation service sub-platform 122 to provide the government user with related information of the gas user. The smart supervision service sub-platform 123 may correspond to the supervision user sub-platform 113 to provide the supervision user with related information of the safety supervision.

In some embodiments, the smart gas service platform 120 may interact with the smart gas user platform 110 and the smart gas management platform 130, respectively. In some embodiments, the smart gas service platform 120 may issue the query instructions of the gas operation user and the feedback information to a smart gas data center 133 and receive the related information of the gas work order uploaded by the smart gas data center 133. A manner of interaction between the smart gas service platform 120 and the smart gas user platform 110 is found in the related descriptions above-mentioned.

The smart gas management platform 130 may refer to a platform that overall plans and coordinates connection and collaboration among the functional platforms, brings together all of the information of the Internet of Things, and provides functions of perception management and control management for an Internet of Things operational system. In some embodiments, the smart gas management platform 130 may be configured to obtain the execution data of the gas work order, wherein the execution data includes at least one of a type of the gas work order, a disposal location of the gas work order, a disposal difficulty of the gas work order, and an executant of the work order; determine at least one gas problem corresponding to the gas work order and a reference reason of the at least one gas problem based on the execution data of the gas work order; determine the target processing scheme of the gas work order based on the at least one gas problem and the reference reason of the at least one gas problem, and sending the target processing scheme to the user terminal of the executant of the gas work order; and in response to that a feedback of the user terminal satisfies a feedback preset condition, improve a risk level of the gas work order and provide an early warning notification.

More descriptions regarding the gas work order, the execution data and the way which is obtained, the at least one gas problem and the reference reason of the at least one gas problem, the target processing scheme and the way which is determined, the feedback preset condition, the risk level, and the early-warning notification may be found in FIGS. 2-6 and the related descriptions thereof.

In some embodiments, the smart gas management platform 130 may include a smart customer service management sub-platform 131, a smart operational management sub-platform 132, and the smart gas data center 133.

In some embodiments, the smart gas management platform 130 interacts with the smart gas service platform 120 and the smart gas sensor network platform 140 through the smart gas data center 133. In some embodiments, the smart gas data center 133 may issue instructions for obtaining the related data of the gas device (e.g., related operating information of gas pipes in different areas as shown in different gas work orders, etc.) to the smart gas sensor network platform 140 and receive the related data of the gas device uploaded by the smart gas sensor network platform 140. A manner of interaction between the smart gas data center 133 and the smart gas service platform 120 is found in the related descriptions above-mentioned.

In some embodiments, the smart customer service management sub-platform 131, the smart operational management sub-platform 132, and the smart gas data center 133 are independent to each other. In some embodiments, the smart customer service management sub-platform 131 and the smart operational management sub-platform 132 may interact with the smart gas data center 133 bidirectionally. In some embodiments, the smart gas data center 133 may send the feedback information of the gas operation user and the related data of the gas device to the smart customer service management sub-platform 131 and the smart operational management sub-platform 132 for analysis and processing, and receive the related information of the gas work order processed by the smart customer service management sub-platform 131 and the smart operational management sub-platform 132.

In some embodiments, the smart customer service management sub-platform 131 may include a message management module. The message management module may be configured to push a related notification of the gas work order (e.g., a notification of pending task additions and/or extensions, a notification of gas outage, etc.), and may also be configured to deliver messages such as an alarm of device monitoring, an alarm of gas usage security monitoring, and an abnormality of gas usage to the gas operation user.

In some embodiments, the smart operational management sub-platform 132 may include a comprehensive office management module. The comprehensive office management module may be configured to overall plan operational human resources, public resources, gas devices, daily office, administration, and other matters.

In some embodiments, the smart customer service management sub-platform 131 may also include other management modules (e.g., a revenue management module, etc.), and the smart operational management sub-platform 132 may also include other management modules (e.g., a gas reserve management module, etc.), and different management modules may perform different functions, which will not be limited herein.

The smart gas sensor network platform 140 may refer to a platform that performs unified management on perception communication. In some embodiments, the smart gas sensor network platform 140 may be configured as a communication network and gateway. The smart gas sensor network platform 140 may employ a plurality of sets of gateway servers, or a plurality of sets of smart routers, which will not be further limited herein.

In some embodiments, the smart gas sensor network platform 140 may interact with the smart gas management platform 130 and the smart gas object platform 150. In some embodiments, the smart gas sensor network platform 140 may issue the instructions for obtaining related data of the gas device to the object platform 150 and may receive the related data of the gas device uploaded by the smart gas object platform 150. A manner of interaction between the smart gas sensor network platform 140 and the smart gas data center 133 is found in the related descriptions above-mentioned.

In some embodiments, the smart gas sensor network platform 140 may include a gas indoor device sensor network sub-platform 141 and a gas pipe network device sensor network sub-platform 142. In some embodiments, the gas indoor device sensor network sub-platform 141 may correspond to a gas indoor device object sub-platform 151 for obtaining related data of an indoor device. The gas pipe network device sensor network sub-platform 142 may correspond to a gas pipe network device object sub-platform 152 for obtaining related data of a gas pipe network device.

The smart gas object platform 150 may refer to a platform configured to obtain the related data of the gas device. In some embodiments, the smart gas object platform 150 may be configured as various devices, for example, an indoor device (e.g., a metering device, etc.), a pipe device (e.g., a valve control device, etc.), a monitoring device (e.g., a temperature sensor, etc.), etc.

In some embodiments, the smart gas object platform 150 may interact with the smart gas sensor network platform 140. A manner of interaction between the smart gas object platform 150 and the smart gas sensor network platform 140 is found in the related descriptions above-mentioned.

In some embodiments, the smart gas object platform 150 may include the gas indoor device object sub-platform 151 and the gas pipe device object sub-platform 152. In some embodiments, the gas indoor device object sub-platform 151 may obtain the related data of the indoor device and upload the related data of the indoor device to the smart gas data center 133 through the gas indoor device sensor network sub-platform 141. In some embodiments, the gas pipe device object sub-platform 152 may obtain the related data of the pipe device and upload the related data of the pipe device to the smart gas data center 133 through the gas pipe device sensor network sub-platform 142.

In some embodiments of the present disclosure, the Internet of Things system 100 for performing the work order of the gas platform based on the smart gas operation is constructed through an Internet of Things functional architecture of five platforms using a manner of combing and arranging a total platform and sub-platforms, which not only can share data processing pressure of the total platform, but also can allow independence of data, ensure data classification transmission and traceability, and a classification of instruction issuance and processing, making the Internet of Things structure and the data processing to be clear and controllable, which facilitates a control of the Internet of Things and the data processing.

FIG. 2 is a flowchart illustrating an exemplary method for processing a work order of a gas platform based on smart gas operation according to some embodiments of the present disclosure. In some embodiments, process 200 may be executed by a processor in the smart gas management platform 130. As shown in FIG. 2, process 200 includes the following operations:

Step 210, obtaining execution data of a gas work order.

The gas work order is a work order related to gas that is configured to record information related to a gas work. One gas work order may correspond to an individual gas work or to a portion of a large gas work. For example, a gas work order may correspond to a repair work of a section of a gas pipe; or as another example, if a gas station requires a full inspection, there may be a plurality of gas work orders, and one gas work order of the plurality of gas work orders may correspond to an inspection of a section of a gas pipe connected to the station.

The execution data is data related to a gas work recorded on the gas work order.

In some embodiments, the execution data includes at least one of a type of the gas work order, a disposal location of the gas work order, a disposal difficulty of the gas work order, and an executant of the gas work order.

Types of gas work orders are different types obtained by differentiating the gas work orders based on certain properties. For example, if the gas work orders are classified based on work types of the gas work orders, the types of the gas work orders may include types of gas device installation, gas device/pipe inspection, gas device/pipe repair, etc. As another example, if the gas work orders are classified based on locations of the gas works, the types of gas work orders may include types of factory, residential, shopping mall, etc.

The disposal location is a specific location where the gas work of the gas work order is performed. For example, the disposal location may be a residential address of an ordinary gas user. As another example, the disposal location may be a section of a gas pipe.

The disposal difficulty refers to a difficulty of completing the gas work of the gas work order. The disposal difficulty may be expressed through specific values, for example, a disposal difficulty may be expressed by levels 1-10, the larger the value, the higher the level, the greater the disposal difficulty.

In some embodiments, the disposal difficulty may be determined based on a prior experience. For example, a gas manager may determine the disposal difficulty of a gas work order based on the prior experience.

In some embodiments, the disposal difficulty may be determined based on historical data. For example, a historical gas work order with the same execution data (e.g., the type of the gas work order and the disposal location described above) as a current gas work order is matched for the current gas work order, and a disposal difficulty of the historical gas work order is determined as a disposal difficulty of the current gas work order.

The executant refers to staff who performs the gas work of the gas work order. One gas work order may correspond to one or more executants. For example, the executant may include staff who initially performs the gas work, and staff who subsequently comes to support and refine the gas work.

In some embodiments, the smart gas management platform 130 may obtain the execution data from the smart gas data center 133. In some embodiments, the execution data may be saved to the smart gas data center 133 when the gas work order is generated. In some embodiments, the execution data may be updated and saved to the smart gas data center 133 in time after the gas work order is completed.

Step 220, determining at least one gas problem corresponding to the gas work order and a reference reason of the at least one gas problem based on the execution data of the gas work order.

The gas problem is a problem related to the gas that occurs during a usage of the gas, for example, a gas leakage, insufficient supply pressure of the gas, useless of the gas, etc. One gas work order may correspond to one or more gas problems.

The reference reason is a reason of the gas problem during the usage of the gas. For example, when the gas problem is the gas leakage, a possible reference reason of the gas problem may be a damage of a gas transmission pipe.

In some embodiments, the smart gas management platform 130 may process the execution data of the gas work order through modeling or various feasible data analysis manners to determine the at least one gas problem and the reference reason of the at least one gas problem corresponding to the gas work order.

In some embodiments, the smart gas management platform 130 may construct a feature vector based on the execution data of the gas work order. There may be a plurality of ways to construct the feature vector based on the execution data of the gas work order. For example, the execution data of the gas work order may be represented by a vector, and a feature vector p constructed based on the execution data (a, b, c, d) of the gas work order, where the execution data (a, b, c, d) may denote a type of the gas work order as a, a disposal location of the gas work order as b, a disposal difficulty of the gas work order as c, and an executant of the gas work order as d.

The vector database in the smart gas data center 133 includes a plurality of vector sub-databases, where an execution data vector sub-database includes a plurality of reference vectors, at least one gas problem corresponding to each gas problem of the plurality of gas problem, and the reference reason of the at least one gas problem. More descriptions regarding the vector database and the vector sub-databases may be found in FIG. 3 and the related descriptions thereof.

The reference vector is constructed based on historical execution data of the historical gas work order, and the at least one gas problem and the reference reason of the at least one gas problem corresponding to the reference vector is at least one gas problem and the reference reason of the at least one gas problem corresponding to a historical gas work order. A vector to be matched is constructed based on the execution data of the current gas work order. A manner of construction of the reference vector and the vector to be matched may be found in the above feature vector.

In some embodiments, the smart gas management platform 130 may separately calculate vector distances (e.g., cosine distances, etc.) between a vector to be matched and each reference vector of the plurality of reference vectors to determine at least one gas problem and a reference reason of the at least one gas problem corresponding to the vector to be matched. For example, a vector distance between vectors to be matched that satisfies the preset condition is determined as a target vector, and at least one gas problem and the reference reason of the at least one gas problem corresponding to the target vector is used as the at least one gas problem and the reference reason of the at least one gas problem corresponding to the vector to be matched. The preset condition may be arranged according to a situation. For example, the preset condition may be that the vector distance is minimum or that the vector distance is less than a distance threshold, etc.

In some embodiments, the smart gas management platform 130 may predict the at least one gas problem corresponding to the gas work order and a probability of occurrence of the at least one gas problem based on the execution data of the gas work order; determine a target gas problem of the gas work order based on the probability of occurrence; and determine a reference reason of the target gas problem in a vector database based on the target gas problem.

Figure 4:
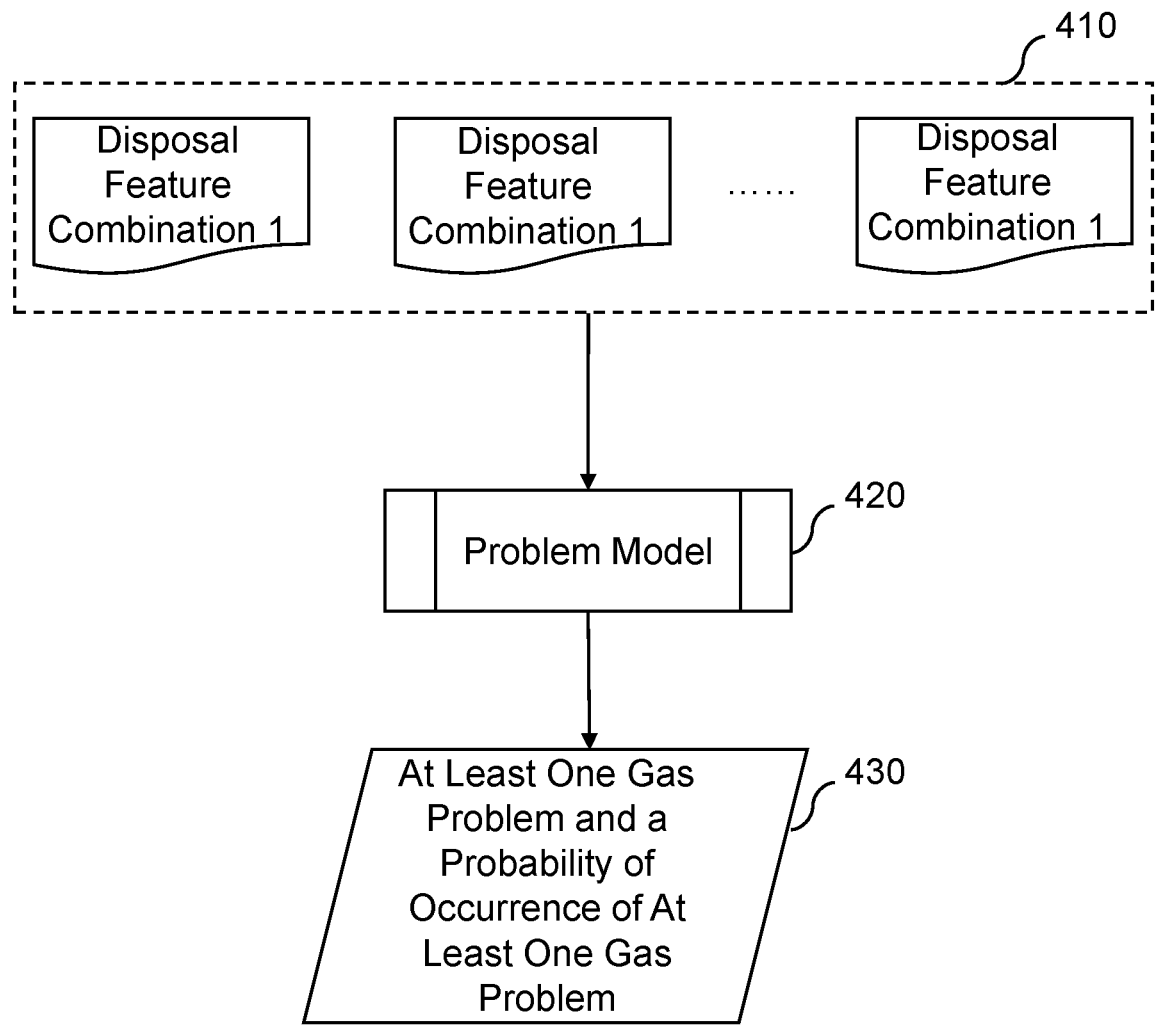
FIG. 4 is a schematic diagram illustrating an exemplary problem model according to some embodiments of the present disclosure.

More descriptions regarding the probability of occurrence of the gas problem and the way of prediction thereof, the target gas problem and the way of determination thereof, the vector database, and the reference reason of the target gas problem and the way of determination thereof may be found in FIG. 3 and FIG. 4 the related descriptions thereof.

Step 230, determining a target processing scheme of the gas work order based on the at least one gas problem and the reference reason of the at least one gas problem, and sending the target processing scheme to a user terminal of the executant of the gas work order.

The target processing scheme refers to an execution scheme to complete the gas work of the gas work order, and a gas problem corresponds to a target processing scheme. For example, when the gas problem corresponding to the gas work order is the gas leakage and the possible reference reason thereof is a damage of the gas transmission pipe, the target processing scheme may be to repair the gas transmission pipe.

In some embodiments, the smart gas management platform 130 may determine the target processing scheme of the gas work order based on the at least one gas problem and the reference reason of the at least one gas problem through various feasible information data processing methods.

In some embodiments, the smart gas management platform 130 may determine the target processing scheme of the gas work order based on at least one gas problem and the reference reason of the at least one gas problem through a preset table. For example, the smart gas management platform 130 may create a table based on the at least one gas problem and the reference reason of the at least one gas problem corresponding to the historical gas work order and the corresponding processing scheme, and find the historical gas work order with at least one same gas problem and a reference reason of the at least one same gas problem corresponding to the current gas work order by looking up the table, and the processing scheme corresponding to the historical gas work order is determined as the target processing scheme.

In some embodiments, the smart gas management platform 130 may determine at least one candidate processing scheme for each gas problem based on the at least one gas problem and the reference reason of the at least one gas problem; predict working hours required for the each candidate processing scheme based on the at least one candidate processing scheme; and in response to that the working hours satisfy a preset condition of the working hours, determine the candidate processing scheme as the target processing scheme.

Figure 5:
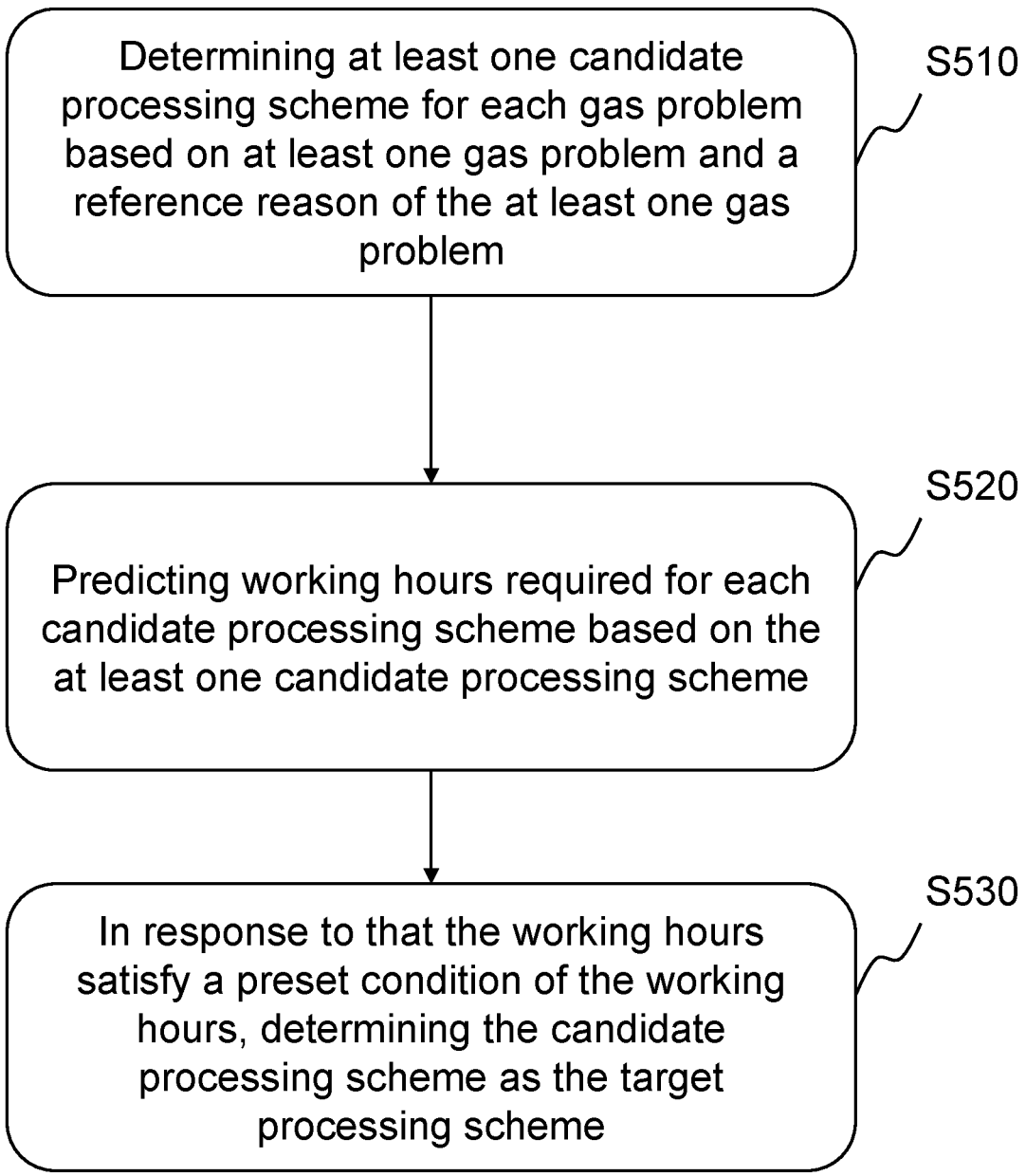
FIG. 5 is a flowchart illustrating an exemplary process for determining a target processing scheme according to some embodiments of the present disclosure.
Figure 6:
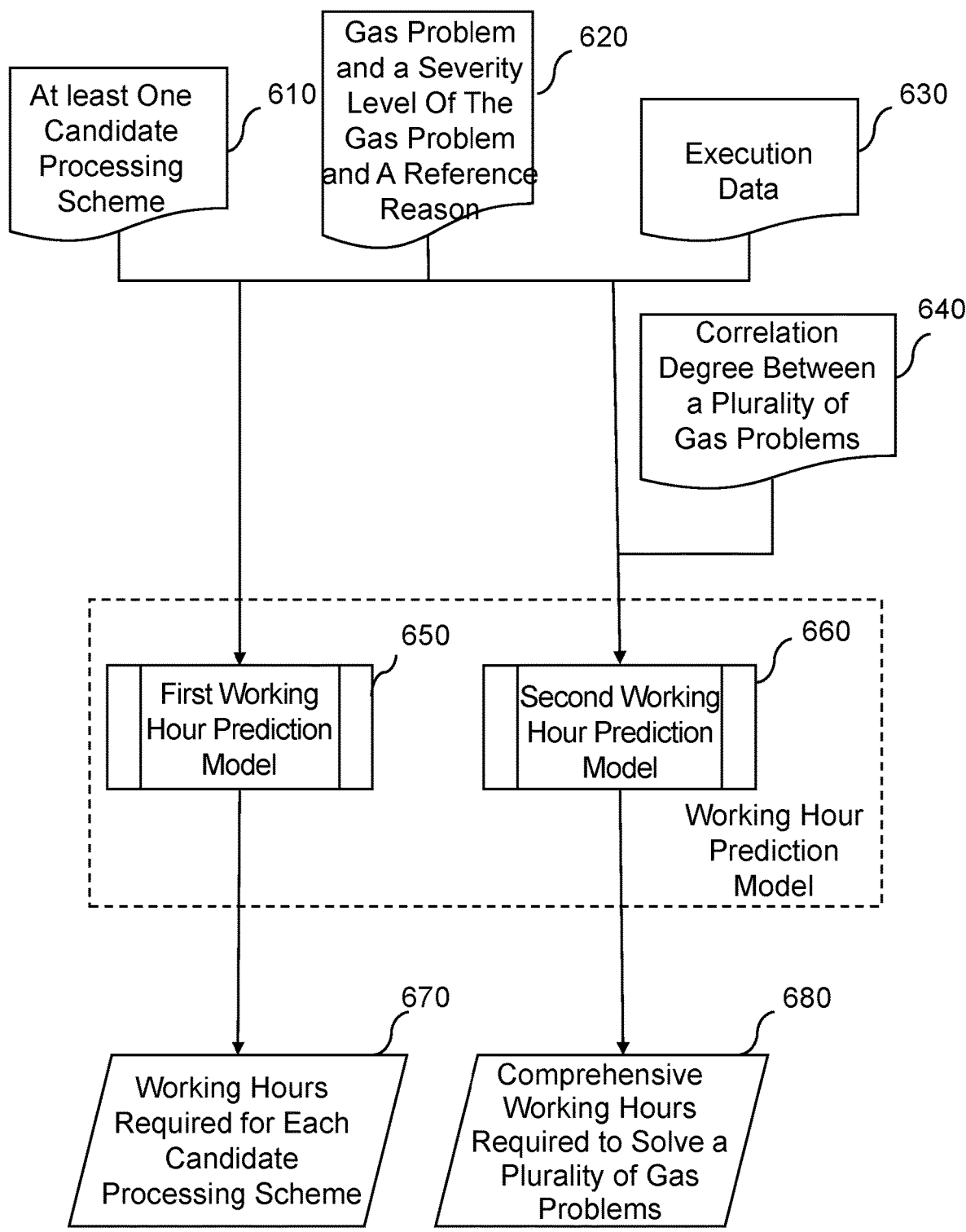
FIG. 6 is a schematic diagram illustrating an exemplary working hour prediction model according to some embodiments of the present disclosure.

More descriptions regarding the candidate processing schemes and the way of determination thereof, the working hours required for the candidate processing schemes and the way of prediction thereof, and the preset condition of the working hours may be found in FIG. 5 and FIG. 6.

Step 240, in response to that a feedback of the user terminal satisfies a feedback preset condition, improving a risk level of the gas work order and providing an early warning notification.

The user terminal may include a terminal device used by a plurality of users, e.g., a cell phone, a tablet, a computer, etc. In some embodiments, the user terminal may be configured in the government user sub-platform 112. More descriptions regarding the government user sub-platform 112 may be found in FIG. 1 and the related descriptions thereof.

The feedback refers to an evaluation of the executant for processing the target solution. For example, a feedback may be whether the target scheme successfully solves the gas problem, if it is, the feedback may be "yes", if not, the feedback may be "no". As another example, a feedback may be a degree of effectiveness of the target scheme to solve the gas problem, and the degree of effectiveness may be denoted by a score of 0-5, the higher the score, the more applicable the target scheme.

The feedback preset condition is a pre-condition configured to determine whether to increase the risk level of the gas work order. For example, the feedback preset condition may be a feedback of "No", which means that the target scheme does not solve the gas problem, then the risk level of the gas work order is increased. As another example, the feedback preset condition may be a feedback of "≤2 points", which means that the target scheme is not effective in solving the gas problem, then the risk level of the gas work order is increased.

The risk level refers to a risk degree of the gas work order. The risk level may be denoted by levels 1-5, the higher the value, the higher the risk level, the greater the risk degree, and the more important attention is needed.

The early warning notification is a notification for the gas work order issued by the Internet of Things system for processing the work order of the gas platform based on the smart gas operation, and the early warning notification is configured to remind the gas manager to significantly focus on the gas work order. The early warning notifications may be expressed in own forms, for example, an early warning notification may be sent to the user terminal through message push.

In some embodiments, the early warning notification may be sent when the risk level of the gas work order is increased. In some embodiments, the early warning notification may be sent when the risk level of the gas work order is greater than a risk threshold. The risk threshold is a specific risk level arranged by a human or a system, for example, the risk threshold may be level 3.

In some embodiments of the present disclosure, the gas platform undertakes tasks such as a portion of tasks, such as supervising the gas work order execution quality and solving a difficult gas work order, etc., and predicts the gas problem corresponding to the gas work order and the reference reason of the gas problem based on the gas platform to give suggestions in time, which may satisfies needs of different gas work order executants, so that the gas problem may be solved in time, the quality of gas work order execution and an solving efficiency of the gas problem are effectively improved, a count of poorly processing the work order is reduced, and a satisfaction of the gas customer is improved.

FIG. 3 is an exemplary flowchart illustrating a process for determining at least one gas problem corresponding to a gas work order and a reference reason of the gas problem according to some embodiments of the present disclosure. In some embodiments, process 300 may be performed by the smart gas management platform 130. As shown in FIG. 3, process 300 includes the following operation:

Step 310, predicting at least one gas problem corresponding to the gas work order and a probability of occurrence of the at least one gas problem based on execution data of the gas work order.

More descriptions regarding the gas work order, the execution data, and the gas problems may be found in FIG. 2 and the related descriptions thereof.

The probability of occurrence of the gas problem is configured to indicate a probability that the gas problem may occur, and each gas problem of the at least one gas problem corresponds to one probability of occurrence. For example, if a gas problem is gas leakage, a probability of occurrence may be 30%, and if a gas problem is useless of the gas, a probability of occurrence may be 0.

In some embodiments, the smart gas management platform 130 may process the execution data of the gas work order by modeling or various feasible data analysis manners (e.g., correlation analysis manners, etc.) to predict the at least one gas problem corresponding to the gas work order and the probability of occurrence of the at least one gas problem.

In some embodiments, the smart gas management platform 130 may obtain a plurality of disposal feature combinations based on the execution data; and predict the at least one gas problem corresponding to the gas work order and the probability of occurrence of the at least one gas problem by processing the plurality of disposal feature combinations through a problem model, and the problem model is a machine learning model.

The disposal feature combination is configured to represent related information of disposal in the execution data. In some embodiments, the disposal feature combination includes a disposal feature name and a disposal feature value.

The disposal feature name is specific disposal information, and the disposal feature value is a value obtained by encoding content corresponding to the disposal feature name in advance. For example, a disposal feature name may be a "disposal location", a disposal feature value may be "1", "1" denotes a gas stove, then a set of disposal feature combinations is "disposal location, 1". As another example, a disposal feature name may be "disposal difficulty", a disposal feature value may be "5", "5" denotes a disposal difficulty of 5, then a set of disposal features combination is "disposal difficulty, 5".

In some embodiments, any one of the elements of the execution data of the gas work order (e.g., the type of gas work order, the executant, etc.) may constitute a disposal feature combination.

In some embodiments, the smart gas management platform 130 may process the execution data through various data extraction models to obtain the disposal feature combination. For example, if there is image data existing in the execution data of the gas work order, the smart gas management platform 130 may process the image data through an image model to extract the disposal feature name and the disposal feature value to obtain the disposal feature combination. As another example, if there is audio data existing in the execution data of the gas work order, the smart gas management platform 130 may process the audio data through an audio model to extract the disposal feature name and the disposal feature value to obtain the disposal feature combination.

More descriptions regarding on the problem model and the predicting the at least one gas problem corresponding to the gas work order and the probability of occurrence of the at least one gas problem through the problem model may be found in FIG. 4 and the related descriptions thereof.

Step 320, determining a target gas problem of the gas work order based on the probability of occurrence.

The target gas problem is a gas problem that satisfies a possibility pre-condition among the at least one gas problem of the plurality of gas problems corresponding to the gas work order obtained by prediction. The possibility pre-condition is a condition configured to determine whether a gas problem is a target gas problem, for example, a possibility pre-condition may be that a probability of occurrence corresponding to the gas problem is greater than 80%.

In some embodiments, the smart gas management platform 130 may determine a gas problem that satisfies a possibility pre-condition as a target gas problem, and the target gas problem may be one or more.

Step 330, determining a reference reason of the target gas problem in a vector database based on the target gas problem.

More descriptions regarding the reference reason may be found in FIG. 2 and the related descriptions thereof.

The vector database is a database configured to store, retrieve, and analyze vectors. In some embodiments, a vector database may include a plurality of vector sub-databases, and different vector sub-databases store different types of vectors. For example, an execution data vector sub-database may store vectors constructed based on the execution data of the gas work order. As another example, a gas problem vector sub-database may store vectors constructed based on the gas problem. In some embodiments, the smart gas management platform 130 may call a corresponding vector sub-database based on the types of vectors being processed.

In some embodiments, a vector database may store a large count of vectors and one or more related information corresponding to the large count of vectors. For example, a gas problem vector sub-database may store a large count of vectors constructed based on the gas problem, and the reference reasons and processing schemes corresponding to these vectors, etc.

In some embodiments, the smart gas management platform 130 may determine a reference reason of the target gas problem based on matching the target problem vector of the target gas problem with the historical problem vector corresponding to the historical gas problem in the vector database to obtain a similar problem vector and a reference reason corresponding to the similar problem vector and determine the reference reason of the target gas problem.

In some embodiments, the smart gas management platform 130 may construct the target problem vector based on related information of the target gas problem. There may be a plurality of ways to construct the target problem vector based on the related information of the target gas problem. For example, related information of the target gas problem may be represented by a vector. The smart gas management platform 130 construct a target problem vector q based on the related information of the target gas problem $(r, x, y, z)$, where the related information of the target gas problem $(r, x, y, z)$ may denote a type of the target gas problem as $r$, a location of the occurrence of the target gas problem as $x$, a probability of occurrence of the target gas problem as $y$, and a count of historical occurrences of the target gas problem as $z$.

The gas problem vector sub-database in the smart gas data center 133 includes a plurality of historical problem vectors and reference reasons corresponding to each historical problem vector of the plurality of historical problem vectors, and the reference reasons are constructed based on the related information of the plurality of historical gas problems. A manner of construction of the historical problem vectors may be referred to the target problem vectors described above.

In some embodiments, the smart gas management platform 130 may obtain a similar problem vector based on the target problem vector and the historical problem vector, and determine the reference reason corresponding to the similar problem vector as the reference reason of the target problem vector, thereby determining the reference reason of the target gas problem. The way the smart gas management platform 130 obtains the similar problem vector is the same manner as the way the smart gas management platform 130 obtains the target vector. More descriptions of obtaining the target vector may be found in FIG. 2 and the related descriptions thereof.

In some embodiments, the smart gas management platform 130 may receive an execution feedback from the executant of the gas work order, and determine an updated target gas problem and an updated reference reason of the updated target gas problem based on the execution feedback.

The execution feedback refers to information of feedback from the executant during a process of performing the gas work based on the target gas problem and the reference reason of the target gas problem determined through the smart gas management platform 130. The execution feedback may be represented in various forms, e.g., a form of image, a form of video, a form of voice, etc.

The updated target gas problem is a gas problem that is corrected for the target gas problem determined by the smart gas management platform 130. For example, if a target gas problem determined by the smart gas management platform 130 is "Malfunction of Gas Stove", the executant find an actual problem is "Gas Leakage" during a processing of performing the gas work, and an updated target gas problem may be "Gas Leakage".

The updated reference reason refers to a reference reason that is corrected and updated for the reference reason of the target gas problem determined by the smart gas management platform 130. For example, if a target gas problem determined by the smart gas management platform 130 is "Insufficient Supply Pressure of Gas", a reference reason of the target gas problem is "Cracks in the Gas Transmission Pipe", and if the executant find an actual problem is "Error Regulation Parameters of a Regulation Pressure Station" during a processing of performing the gas work, an updated reference reason may be "Error Regulation Parameters of a Regulation Pressure Station".

In some embodiments, the execution feedback may include a direct feedback and an indirect feedback.

The Direct feedback means that the executant provides the direct feedback of the target gas problem and the reference reason of the gas problem determined by the smart gas management platform 130. For example, a direct feedback may be "The reference reason of the target gas problem is incorrectly located". As another example, if a target gas problem determined by the smart gas management platform 130 is "Insufficient Supply Pressure of Gas" and a reference reason of the target gas problem is "Cracks in the Gas Transmission Pipe", and if the executant find an actual problem is "Error Regulation Parameters of a Regulation Pressure Station" during a processing of performing the gas work, a direct feedback may be "Error Regulation Parameters of a Regulation Pressure Station".

The indirect feedback refers to a feedback given by the executant based on the actual situation when executing the gas work for the target gas problem and the reference reason of the gas problem determined by the smart gas management platform 130, and is unable to determine whether the reference reason is correct. For example, an indirect feedback may be an image of a gas work site. As another example, an indirect feedback may be a voice of the executant giving a detailed description of the actual situation.

In some embodiments, the smart gas management platform 130 may directly determine the updated target gas problem and the updated reference reason of the updated target gas problem based on the direct feedback of the executant. For example, if the smart gas management platform 130 determines a target gas problem as "Malfunction of Gas Stove" and the reference reason of the target gas problem is determined as "Parts A of Gas Stove is Aging", and a direct feedback of the executant is "an actual situation is gas leakage, and a preliminary judgment is that the gas transmission pipe is damaged, then an updated target gas problem determined based on the direct feedback is "Gas Leakage" and a updated reference reason is "Damage of Gas Transmission Pipe".

In some embodiments, the smart gas management platform 130 may extract an indirect feedback feature through a machine learning model (e.g., an image model, an audio models, etc.) based on the indirect feedback of the executant, thereby determining the target gas problem to determine the updated target gas problem and the updated reference of the updated target gas problem based on the vector database.

In some embodiments, the smart gas management platform 130 may construct an indirect feedback vector based on an indirect feedback feature. The indirect feedback feature is a feature that represent related data information of the indirect feedback, and there may be a plurality of types of ways to construct the indirect feedback vector based on the indirect feedback feature. For example, the indirect feedback feature may be represented by a vector. The smart gas management platform 130 construct an indirect feedback vector m based on an indirect feedback feature (e, f, g, h), where the indirect feedback feature (e, f, g, h) may denote that the indirect feedback is represented as e, a type of a problem involved in the indirect feedback is f, an occurrence location of related content of the indirect feedback is g, and a parts involved in the indirect feedback is h.

An indirect feedback vector sub-database in the smart gas data center 133 includes a plurality of historical feedback vectors and the gas problem and the reference reason of the gas problem corresponding to each historical feedback vector of the plurality of historical feedback vectors, and the plurality of historical feedback vectors is constructed based on the historical indirect feedback feature. A manner of construction of the plurality of historical feedback vectors refers to the indirect feedback vector described above.

In some embodiments, the smart gas management platform 130 may obtain a similar feedback vector based on the indirect feedback vector and the historical feedback vector, and determine the gas problem and the reference reason of the gas problem corresponding to the similar feedback vector as the updated target gas problem and the updated reference reason of the updated target gas problem of the indirect feedback vector. The way the smart gas management platform 130 obtains the similar feedback vector is the same as the way the smart gas management platform 130 obtains the target vector. Detailed descriptions of obtaining the target vector may be found in FIG. 2 and the related descriptions thereof, which will not be repeated herein.

In some embodiments of the present disclosure, the updated target gas problem and the updated reference reason of the updated target gas problem is determined based on the direct feedback and the indirect feedback from the executant, which may further correct the target gas problem and the reference reason of the target gas problem determined by the gas smart management platform 130 to improve an accuracy of final judgment results, and determine as many current or potential gas problems of different gas work orders as possible to improve efficiency and quality of the gas work order execution, and avoid misjudgment and a waste of manual resources.

In some embodiments, process 300 may also include step 340 and step 350.

Step 340, determining the processing scheme corresponding to the target gas problem in the vector database based on the target gas problem, and forming a recommended processing scheme.

The recommended processing scheme is a recommended processing scheme corresponding to the target gas problem. One target gas problem corresponds to one recommended processing scheme.

In some embodiments, the smart gas management platform 130 matches the target problem vector of the target gas problem with the historical problem vector corresponding to the historical gas problem in the gas problem vector sub-database to obtain a similar problem vector and a processing scheme corresponding to the similar problem vector, and determines the processing scheme corresponding to the target gas problem, thereby forming a recommended processing scheme. A vector sub-database in the smart gas data center 133 includes the plurality of historical problem vectors and a processing scheme corresponding to each historical problem vector of the plurality of historical problem vectors.

More descriptions regarding the target problem vector and a manner of construction thereof, the historical problem vector and a manner of construction thereof, and a manner of determining the similar problem vector may be found in FIG. 3 and the related description thereof.

Step 350, generating the target processing scheme based on the recommended processing scheme.

In some embodiments, the smart gas management platform 130 may determine the recommended processing scheme directly as the target processing scheme. In some embodiments, the smart gas management platform 130 may determine a portion of recommended processing schemes directly as the target processing schemes.

More descriptions regarding the target processing scheme may be found in FIG. 2 and the descriptions thereof.

In some embodiments, the smart gas management platform 130 may determine a severity level of the at least one gas problem corresponding to the gas work order. The severity level may be configured to determine the target processing scheme based on the recommended processing scheme. The severity level may also be configured to determine the target processing scheme based on candidate processing schemes.

The severity level is configured to reflect the severity level of the gas problem. The severity level may be denoted by levels 1-5, the higher the value, the higher the severity level, and the more serious the impact generated by the gas problem.

In some embodiments, the smart gas management platform 130 may determine the severity level of the gas problem by querying based on a severity level vector sub-database. The severity level vector sub-database includes a count of historical vectors, elements of different historical vectors represent different gas problems, and the severity level vector sub-database also saves the severity level of the gas problem corresponding to each historical vector, and the smart gas management platform 130 may query the historical vectors containing the same gas problem in the severity level vector sub-database based on the current gas problem, and determine the severity level corresponding to the historical reference vector as the severity level of the current gas problem.

In some embodiments, the severity level of the gas problem may be determined based on the prior experience. For example, if gas problem A is "gas inoperable" and gas problem B is "leakage gas pipe", then a severity level of the gas problem B is higher than a severity level of the gas problem A.

In some embodiments, the smart gas management platform 130 may screen and rank the recommended processing schemes based on the severity level of the gas problem to determine the target processing scheme. In some embodiments, the smart gas management platform 130 may screen out the recommended processing schemes corresponding to gas problems with a severity level less than a level threshold, and retain and determine remaining recommended processing schemes as target processing schemes, where the level threshold refers to a specific severity level, such as level 3. In some embodiments, the smart gas management platform 130 may rank the recommended processing schemes corresponding to the gas problems based on the severity level, and determine the level threshold based on the ranking results.

In some embodiments, the smart gas management platform 130 may also determine the candidate processing schemes and predict the working hours required for the candidate processing schemes based on the at least one gas problem and the reference reason of the at least one gas problem, thereby determining the target processing scheme. See FIG. 5, FIG. 6, and their related descriptions for More descriptions regarding the candidate processing schemes, the working hours and a way of prediction thereof, and a process for determining the target processing scheme based on the candidate processing scheme and the working hours.

More descriptions of determining the target processing scheme based on the candidate processing schemes and the severity level may be found in FIG. 5 and the related descriptions thereof.

In some embodiments of the present disclosure, a introduction of the severity level of the gas problem in determining the target processing scheme may help the gas manager pay attention to and process the gas problem with a higher severity level in time to ensure a safety of gas usage, and an operational load of the Internet of Things 100 for processing the work order of the gas platform based on smart gas operation may be reduced by screening out the processing schemes corresponding to the gas problems with a lower severity level based on the severity level, and an efficiency of the smart gas management platform 130 in processing data is improved.

FIG. 4 is a schematic diagram illustrating an exemplary problem model according to some embodiments of the present disclosure.

In some embodiments, the smart gas management platform 130 may process a plurality of disposal feature combinations through the problem model to predict at least one gas problem corresponding to a gas work order and a probability of occurrence of the at least one gas problem.

The problem model is a model for predicting the at least one gas problem and the probability of occurrence of the at least one gas problem corresponding to the gas work order. In some embodiments, a problem model 420 may process a plurality of disposal feature combinations 410 to predict the at least one gas problem and a probability of occurrence of at least one gas problem 430. In some embodiments, the problem model 420 may be a Transformer structure.

As shown in FIG. 4, an input of the problem model 420 may include the plurality of disposal feature combinations 410. A plurality of input disposal feature combinations 410 correspond to the same gas work order, and the plurality of disposal feature combinations may be constituted based on any element of the execution data of the gas work order. For example, an input disposal feature combination 1 may be "a disposal location, 1 (assuming 1 represents a gas stove)" and an input disposal feature combination 2 may be "a type of gas work order, 2 (assuming 2 represents a gas pipe inspection class)".

The output of the problem model 420 may include the at least one gas problem and the probability of occurrence of at least one gas problem 430. For example, the output gas problem may be "gas leakage", and a probability of occurrence thereof may be 30%. In some embodiments, an output of the problem model 420 may be a gas problem with a probability of occurrence greater than 0 and a probability of occurrence of the gas problem. In some embodiments, an output of the problem model 420 may be a gas problem with a probability of occurrence greater than a probability threshold and a probability of occurrence of the gas problem. The probability threshold may be a value for a specific probability of occurrence, for example, the probability threshold may be 50%.

In some embodiments, the problem model may be trained individually based on the historical data. In some embodiments, the problem model may be obtained by training a plurality of first training samples and a first label.

In some embodiments, each first training sample of the plurality of first training samples includes a plurality of sample disposal feature combinations of a same sample gas work order, and a first label corresponding to the first training sample is whether the sample gas problem in the label is the same as an actual gas problem corresponding to the sample gas work order, if the same, an element corresponding to the corresponding sample gas problem in the first label takes a value of "1, and if it is not the same, a value is taken of "0". The first training sample may be obtained based on the historical data, and the first label may be determined by manual labeling or automatic labeling. The above description is only an example instead of a limitation, and the first label for training data may be obtained by various ways.

When training, the first training sample is input to an initial problem model, a loss function is constructed based on an output of the initial problem model with the first label, and parameters of the initial problem model are updated by the loss function until a trained initial problem model satisfies the first preset condition to obtain a trained problem model, where the first preset condition may be that the loss function is less than a threshold or converges, or a training period reaches a threshold, etc.

In some embodiments of the present disclosure, the contextual semantic information in the plurality of disposal feature combinations may be effectively extracted by employing the a problem model in a Transformer structure for the plurality of disposal feature combinations, which helps the problem model extract potential implicit association features between each disposal feature combinations of the plurality of disposal feature combinations, making interpretability stronger and thereby improving a prediction accuracy of the problem model, and a problem model employing the Transformer structure supports a parallelized computation, and the computational complexity is better relative to traditional models such as a convolutional neural network model and a deep neural network model, etc.

FIG. 5 is a flowchart illustrating a process for determining an exemplary target processing scheme according to some embodiments of the present disclosure. In some embodiments, process 500 may be performed by the smart gas management platform 130. As shown in FIG. 5, process 500 includes the following steps:

Step 510, determining at least one candidate processing scheme for each gas problem based on at least one gas problem and a reference reason of the at least one gas problem.

More descriptions regarding the at least one gas problem and the reference reason of the at least one gas problem may be found in FIG. 2 and the related descriptions thereof.

The candidate processing scheme refers to a candidate processing scheme to solve a gas problem, and the gas problem may correspond to one or more candidate processing schemes. For example, if the gas problem is "gas leakage" and the reference reason of the gas problem is "a damage of gas transmission pipe", then a candidate processing scheme A may be "repair the damaged gas pipe" and a candidate processing scheme B may be "replace the damaged gas pipe".

In some embodiments, the smart gas management platform 130 may determine the at least one candidate processing scheme for each gas problem based on the at least one gas problem and the reference reason of the at least one gas problem through various feasible data information analysis manners.

In some embodiments, the smart gas management platform 130 may directly determine the at least one candidate processing scheme based on the prior experience according to the at least one gas problem and the reference reason of the at least one gas problem. For example, if a gas problem is "gas leakage" and a reference reason of the gas problem is "a damage of gas transmission pipe", then the smart gas management platform 130 may directly determine that a candidate processing scheme A is "repair the damaged gas pipe" and a candidate processing scheme B is "replace the damaged gas pipe" based on the prior experience.

In some embodiments, the at least one candidate processing scheme may be determined based on the vector database. In some embodiments, the smart gas management platform 130 may determine the at least one candidate processing scheme by querying based on a processing scheme vector sub-database. The processing scheme vector sub-database includes a count of historical vectors, and elements of different historical vectors represent different gas problems, and the processing scheme vector sub-database also save ta processing scheme of the gas problems corresponding to each historical vector, and the smart gas management platform 130 may query the historical vector including the same gas problem in the processing scheme vector sub-database as the historical reference vector based on the current gas problem, and determine the processing scheme corresponding to the historical reference vector as the candidate processing schemes of the current gas problem.

More descriptions regarding the vector database may be found in FIG. 3 and the related descriptions thereof.

Step 520, predicting working hours required for each candidate processing scheme based on the at least one candidate processing scheme.

The working hours required for the each candidate processing scheme is working hours required to solve the gas problem based on the candidate processing schemes. For example, working hours required for a candidate processing scheme A may be 3 hours.

In some embodiments, the smart gas management platform 130 may predict a count of working hours required for the each candidate processing scheme based on the at least one candidate processing scheme through modeling or the various feasible data analysis manners.

In some embodiments, the smart gas management platform 130 may determine the working hours required for the each candidate processing scheme based on the at least one candidate processing scheme through a preset table. For example, the smart gas management platform 130 may preset a working hour lookup table based on a historical processing scheme and corresponding working hours required for the historical processing scheme, find a historical processing scheme that is the same as a current candidate processing scheme by looking up the table, and determine the working hours required for the historical processing scheme as the working hours required for the current candidate processing scheme.

In some embodiments, the smart gas management platform 130 may predict the working hours required for the each candidate processing scheme based on the at least one candidate processing scheme through a working hour prediction model, and the working hour prediction model is a machine learning model.

See FIG. 6 and its associated description for more descriptions regarding the working hour prediction model and predicting the working hours required for the each candidate processing scheme through the working hour prediction model.

Step 530, in response to that the working hours satisfy a preset condition of the working hours, determining the candidate processing scheme as the target processing scheme.

The working hour preset condition is a preset condition configured to determine whether the candidate processing scheme is determined as a target processing scheme. For example, a working hour preset condition may be that the working hours required for the candidate processing scheme is less than a working hour threshold, where the working hour threshold is a specific working hour value, e.g., 3 hours. As another example, a working hour preset condition may be that the working hours required for the candidate processing scheme is the smallest value of all candidate processing schemes.

In some embodiments, in response to not solving the gas problem using the target processing scheme, a candidate processing scheme that requires the least working hours of the remaining candidate processing schemes is determined as a new target processing scheme.

In some embodiments of the present disclosure, for the each gas problem, the at least one candidate processing scheme is determined, so that each kind of processing scheme that may solve the gas problem may be traversed as much as possible. The amount of data that needs to be processed may be reduced by determining the target processing scheme based on at least one candidate processing scheme, such that an efficiency of determining the target processing scheme may be improved. When determining the target processing scheme, an introduction of the working hours required for the candidate processing schemes may make a finalized target processing scheme more conform to the actual needs, and reduce a time cost while effectively solving the gas problem.

In some embodiments, in response to that the gas work order corresponds to the plurality of gas problems, the smart gas management platform 130 may predict comprehensive working hours required to resolve the plurality of gas problems.

The comprehensive working hours are a total count of working hours required to solve the plurality of gas problems.

In some embodiments, the smart gas management platform 130 may predict the comprehensive working hours required to solve the plurality of gas problems through modeling or the various feasible information data processing manners.

In some embodiments, the smart gas management platform 130 may predict the comprehensive working hours required to solve the plurality of gas problems based on the plurality of gas problems and a correlation degree between the plurality of gas problems through a working hour prediction model, and the working hour prediction model is a machine learning model.

The correlation degree is configured to express a correlation between the plurality of gas problems corresponding to the gas work order. The correlation degree may be expressed as a percentage, for example, a correlation degree may be 80%.

In some embodiments, the comprehensive working hours are not a simple sum of the working hours required to solve the each gas problem. When the plurality of gas problems is related, the comprehensive working hours are less than a simple sum of the working hours required to solve the each gas problem.

In some embodiments, the correlation degree between the plurality of gas problems may be calculated based on the historical data. In some embodiments, a correlation degree between any two gas problems A and B of the plurality of gas problems may be calculated by the following equation (1):

$$\text{Correlation degree between gas problems } A \text{ and } B = a \times \left(\frac{AB}{A}\right) + b \times \left(\frac{BA}{B}\right) \quad (1)$$

where a denotes a severity level of a gas problem A, b denotes a severity level of gas problem B, AB denotes a count of times that the gas problem A occurs when gas problem B also occurs, A denotes a total count of times that the gas problem A occurs, BA denotes a count of times that the gas problem B occurs when gas problem A also occurs, and B denotes a total count of times that gas problem B occurs. More descriptions regarding the severity level and the way of determination thereof may be found in FIG. 3 and the related descriptions thereof.

More descriptions regarding the working hour prediction model and predicting the working hours required to solve the plurality of gas problems through the working hour prediction model may be found in FIG. 3 and the related descriptions thereof.

In some embodiments of the present disclosure, when the gas work order corresponds to the plurality of gas problems, a determination of the comprehensive working hours required to solve the plurality of gas problems and an introduction of the correlation degree between any two gas problems of the plurality of gas problems may make the finalized comprehensive working hours more scientific and reasonable and improve an accuracy of predicting the comprehensive working hours.

FIG. 6 is a schematic diagram illustrating an exemplary working hour prediction model according to some embodiments of the present disclosure.

In some embodiments, the working hour prediction model may include a first working hour prediction model and a second working hour prediction model. In some embodiments, the smart gas management platform 130 may predict the working hours required for each candidate processing scheme based on the at least one candidate processing scheme through the first working hour prediction model. In some embodiments, the smart gas management platform 130 may predict comprehensive working hours required to solve a plurality of gas problems based on the plurality of gas problems and a correlation degree between the plurality of gas problems through the second working hour prediction model.

The first working hour prediction model is a machine learning model configured to predict the working hours required for the each candidate processing scheme. The second working hour prediction model is a machine learning model configured to predict the comprehensive working hours required to solve the plurality of gas problems.

In some embodiments, a first working hour prediction model 650 and a second working hour prediction model 660 may be various feasible neural network models, such as, a Graph Neural Network (GN), a Convolutional Neural Network (CNN), a Deep Neural Network (DNN), etc., or any combination thereof.

In some embodiments, the first working hour prediction model 650 may process at least one candidate processing scheme 510, a gas problem and a severity level of the gas problem and a reference reason 620, and execution data 630 to predict working hours required for each candidate processing scheme 670.

In some embodiments, the second working hour prediction model 660 may process the at least one candidate processing scheme 510, the gas problem and the severity level of the gas problem and the reference reason 620, the execution data 630, and the correlation 540 between the plurality of gas problems to predict comprehensive working hours required to solve the plurality of gas problems 680.

As shown in FIG. 6, an input of the first working hour prediction model 650 may include the at least one candidate processing scheme 510, the gas problem and the severity level of the gas problem and the reference reason 620, and the execution data 630, and an output may include the working hours required for each candidate processing scheme 670. The input and the output of the first working hour prediction model 650 address the same gas problem.

For example, one of inputted at least candidate processing scheme 610 may be candidate A "Repair damaged gas transmission line", candidate processing scheme B "Renew damaged gas transmission line", and candidate processing scheme C "Replace parts of gas transmission pipe". The input gas problem and the severity level of the gas problem and the reference reason 620 may be "Gas leakage", the severity level may be "5" and the reference reason may be "Damage of gas transmission pipe". The input execution data 630 may be a type of the gas work order of "gas pipe repair", a disposal location may be "a section of gas pipe", a disposal difficulty may be "level 7", and an executant may be "a staff member". The working hours required for each candidate processing scheme 670 may be (40, 50, 60), where different elements separately correspond to one candidate solution, and a correlation between the elements and the candidate processing scheme may be set in advance, for example, (40, 50, 60) may denote that a working hour required for a candidate processing scheme A is 40 minutes, a working hour required for a candidate processing scheme B is 50 minutes, and a working hour required for a candidate processing scheme C is 40 minutes.

In some embodiments, for each gas problem, different executants solve the solve gas problem with one standard working hour. The standard working hours is standard working hours required by the executant to solve the gas problem, and the standard working hours may be determined in advance by presetting. When the first working hour prediction model 650 outputs the working hours required for the each candidate solution, the candidate processing schemes that requires more working hours than the standard working hours are eliminated, and the working hours required for the remaining candidate processing schemes is output.

In some embodiments, an input of the second working hour prediction model 660 may include the at least one candidate processing scheme 610, the gas problem and the severity level of the gas problem and reference reason 620, the execution data 630, and the correlation degree between a plurality of gas problems 640, and an output may include the comprehensive working hours required to solve the plurality of gas problems 680. The input and the output of the second working hour prediction model 660 address the plurality of gas problems of the same gas work order.

For example, an input correlation between a plurality of gas problems 640 may be (20, 50, 70), indicating that there are three gas problems A, B and C, where different elements separately correspond to a correlation degree between any two gas problems, and a correlation between the elements and the correlation degree may be set in advance, for example, (20, 50, 70) may denote that a correlation degree between gas problems A and B is 20%, a correlation degree between gas problems B and C is 50%, and a correlation degree between gas problems A and C are 70%. The input at least one candidate processing scheme 610 may be a comprehensive candidate processing scheme to solve the above three gas problems. The input gas problems and the severity level of the gas problem and the reference reason 620 may correspond to the three gas problems described above, e.g., the above three gas problems and the severity levels thereof and the reference reasons are denoted by a vector. The input execution data 630 may be the execution data of the gas work order corresponding to the three gas problems described above. The output comprehensive working hours required to solve the plurality of gas problems may be 120 minutes.

In some embodiments, the first working hour prediction model may be trained individually based on the historical data. In some embodiments, the first working hour prediction model may be obtained based on a plurality of second training samples and a second label training.

In some embodiments, the second training sample for training the first working hour prediction model includes a plurality of sample candidate processing schemes, a plurality of sample gas problems and the severity levels thereof and the reference reasons thereof, and a plurality of sample execution data, and a second label corresponding to the second training sample is the processing working hours required for the each sample candidate processing scheme. The second training sample may be obtained based on the historical data, and the second label may be determined based on actual processing working hours for each sample candidate processing scheme, and the actual processing working hours may be obtained based on the historical data. The second label may be determined by manual labeling or automatic labeling. The above description is only an example instead of a limitation, and the second label for training data may be obtained through various ways.

When training the first working hour prediction model, a second training sample may be input into an initial first working hour prediction model, a loss function is constructed based on an output of the initial first working hour prediction model and the second label, and the parameters of the initial first working hour prediction model are updated through the loss function until a trained initial first working hour prediction model satisfies a second preset condition to obtain a trained first working hour prediction model. The second preset condition may be that a loss function is less than a threshold, converges, or a training period reaches a threshold, etc.

In some embodiments, the second working hour prediction model may be trained individually based on the historical data. In some embodiments, the second working hour prediction model may be obtained based on a plurality of third training samples and a third label training.

In some embodiments, the third training sample for training the second working hour prediction model includes a plurality of sample candidate processing schemes, the plurality of sample gas problems and the severity levels thereof and the reference reasons, a correlation between the plurality of sample gas problems, and a plurality of sample execution data, and a third label corresponding to the third training sample is the comprehensive working hours required to solve the plurality of sample gas problems. The third training sample may be obtained based on the historical data, and the third label may be determined based on the actual processing working hours required to solve the plurality of sample gas problems, and the actual processing working hours may be obtained based on the historical data. The third label may be determined by manual labeling or automatic labeling. The above description is only an example instead of a limitation, and the third label for training data may be obtained in various ways.

When training the second working hour prediction model, the third training sample may be input into an initial second working hour prediction model, a loss function is constructed based on an output of an initial second working hour prediction model and the third label, and the parameters of the initial second working hour prediction model are updated through the loss function until a trained initial second working hour prediction model satisfies a third preset condition to obtain a trained second working hour prediction model. The third preset condition may be that a loss function is less than a threshold, converges, or a training period reaches a threshold, etc.

In some embodiments of the present disclosure, by predicting processing working hours through the working hour prediction model, the working hours required for each candidate processing scheme and the comprehensive working hours required to solve the plurality of gas problems may be obtained in advance, so that the gas manager can obtain the corresponding target processing scheme and adjust the target processing scheme accordingly based on the processing working hours; and the inputs to the working hour prediction model include at least one candidate solution, the gas problem and the severity level of the gas problem and reference reason, execution data, and the correlation between the plurality of gas problems, which can effectively improve the accuracy of the model prediction.

It should be noted that the above descriptions of processes 200, 300, 500 are for example and illustration purposes only and do not limit the scope of application of the present disclosure. Various amendments and changes may be made to processes 200, 300, 500 for those skilled in the art under the guidance of the present disclosure. However, these amendments and changes remain within the scope of the present disclosure.

Some embodiments of the present disclosure also provide a computer readable storage medium, the storage medium storing computer instructions, and when the computer reads the computer instructions in the storage medium, the computer executes a method for processing a work order of a gas platform based on smart gas operation.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These alterations, improvements, and modifications are intended to be suggested by the present disclosure and are within the spirit and scope of the exemplary embodiments of this disclosure.

Moreover, certain terminology has been configured to describe embodiments of the present disclosure. For example, the terms "one embodiment," "an embodiment," and/or "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a plurality of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties configured to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the count of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history related to same, any of same that is inconsistent with or in conflict with the present document, or any of same that may have a limiting effect as to the broadest scope of the claims now or later related to the present document. By way of example, should there be any inconsistency or conflict between the description, definition, and/or the use of a term related to any of the incorporated material and that related to the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized according to the teachings herein. Accordingly, embodiments of the present application are not limited to that precisely as shown and described.

What is claimed is:

1. A method for processing a work order of a gas platform based on smart gas operation, comprising:
    obtaining, by a processor of a smart gas management platform of an Internet of Things system for processing a gas work order of a gas platform based on smart gas operation, execution data of the gas work order, wherein the execution data includes at least one of a type of the gas work order, a disposal location of the gas work order, a disposal difficulty of the gas work order, and an executant of the work order;
    determining, by the processor, at least one gas problem corresponding to the gas work order and a reference reason of the at least one gas problem based on the execution data of the gas work order, including:
        obtaining, by the processor, a plurality of disposal feature combinations based on the execution data, wherein the plurality of disposal feature combinations include disposal feature names and disposal feature values; and
        predicting, by the processor, the at least one gas problem corresponding to the gas work order and a probability of occurrence of the at least one gas problem by processing the plurality of disposal feature combinations through a problem model, wherein the problem model is a Transformer structure;
        the problem model is obtained by training a plurality of first training samples and a first label by the processor, each of the plurality of first training samples includes a plurality of sample disposal feature combinations of a sample gas work order, the first label corresponds to the plurality of first training samples is whether a sample gas problem in the first label is same as an actual gas problem corresponding to the sample gas work order;
        the training process of the problem model includes:
            inputting the first training sample to an initial problem model;
            constructing a loss function based on an output of the initial problem model with the first label; and
            updating parameters of the initial problem model by the loss function until a trained initial problem model satisfies a first preset condition, wherein the first preset condition includes the loss function being less than a first threshold or converges and a training period reaching a second threshold;
    determining, by the processor, a target gas problem of the gas work order based on the probability of occurrence; and
    determining, by the processor, the reference reason of the target gas problem in a vector database based on the target gas problem;
    determining, by the processor, a target processing scheme of the gas work order based on the at least one gas problem and the reference reason of the at least one gas problem, including:
        determining, by the processor, processing schemes corresponding to the target gas problem in the vector database based on the target gas problem, and forming a recommended processing scheme; and
        generating, by the processor, the target processing scheme based on the recommended processing scheme; and
    sending, by the processor, the target processing scheme to a user terminal of the executant of the gas work order;
    in response to that a feedback of the user terminal satisfies a feedback preset condition, improving, by the processor, a risk level of the gas work order and providing an early warning notification, wherein the feedback refers to an evaluation of the executant for processing the target gas problem; and
    sending, by the processor, the early warning notification to the user terminal through message push, to remind a gas manager to focus on the gas work order.

2. The method of claim 1, wherein the Internet of Things system for processing the work order based on smart gas operation further includes: a smart gas user platform, a smart gas service platform, a smart gas sensor network platform, and a smart gas object platform; wherein
    the smart gas user platform is configured to obtain the feedback from the user terminal and send the feedback to the smart gas management platform through the smart gas service platform; and the smart gas service platform is configured to send the target processing scheme of the gas work order to the smart gas user platform.

3. The method of claim 1, further including:
receiving an execution feedback from the executant of the gas work order; and
determining an updated target gas problem and an updated reference reason of the updated target gas problem based on the execution feedback.

4. The method of claim 3, wherein the execution feedback includes a direct feedback and an indirect feedback, the indirect feedback includes at least one of an image of a gas work site or a voice of the executant giving a description of an actual situation, the method further comprising:
extracting an indirect feedback feature through a machine learning model, based on the indirect feedback, to determine the target gas problem.

5. The method of claim 1, wherein the determining a target processing scheme of the gas work order based on the at least one gas problem and the reference reason of the at least one gas problem includes:
determining at least one candidate processing scheme for each gas problem based on the at least one gas problem and the reference reason of the at least one gas problem;
predicting working hours required for the each candidate processing scheme based on the at least one candidate processing scheme; and
in response to that the working hours satisfy a preset condition of the working hours, determining the candidate processing scheme as the target processing scheme.

6. The method of claim 5, wherein the at least one candidate processing scheme is determined based on the vector database.

7. The method of claim 5, wherein the predicting working hours required for each candidate processing scheme based on the at least one candidate processing scheme includes:
predicting the working hours required for the each candidate through a working hour prediction model based on the at least one candidate processing scheme, wherein the working hour prediction model is a machine learning model.

8. The method of claim 5, further including:
in response to that the gas work order corresponds to a plurality of gas problems, predicting comprehensive working hours required to solve the plurality of gas problems.

9. The method of claim 8, wherein the in response to that the gas work order corresponds to a plurality of gas problems, predicting comprehensive working hours required to solve the plurality of gas problems includes:
predicting the comprehensive working hours required to solve the plurality of gas problems through a working hour prediction model based on the plurality of gas problems and a correlation degree between the plurality of gas problems, wherein the working hour prediction model is a machine learning model.

10. An Internet of Things system for processing a gas work order of a gas platform based on smart gas operation, comprising: a smart gas user platform, a smart gas service platform, a smart gas management platform, a smart gas sensor network platform, and a smart gas object platform; wherein
the smart gas user platform is configured to obtain a feedback from a user terminal and send the feedback to the smart gas management platform through the smart gas service platform;

the smart gas service platform is configured to send a target processing scheme of the gas work order to the smart gas user platform; and
the smart gas management platform is configured to:
obtain, by a processor of the smart gas management platform, execution data of the gas work order, wherein the execution data includes at least one of a type of the gas work order, a disposal location of the gas work order, a disposal difficulty of the gas work order, and an executant of the work order; and
determine, by the processor, at least one gas problem corresponding to the gas work order and a reference reason of the at least one gas problem based on the execution data of the gas work order, wherein to determine the at least one gas problem corresponding to the gas work order and the reference reason of the at least one gas problem based on the execution data of the gas work order, the smart gas management platform is further configured to:
obtain, by the processor, a plurality of disposal feature combinations based on the execution data, wherein the plurality of disposal feature combinations include disposal feature names and disposal feature values; and
predict, by the processor, the at least one gas problem corresponding to the gas work order and a probability of occurrence of the at least one gas problem by processing the plurality of disposal feature combinations through a problem model, wherein
the problem model is a Transformer structure;
the problem model is obtained by training a plurality of first training samples and a first label by the processor, each of the plurality of first training samples includes a plurality of sample disposal feature combinations of a sample gas work order, the first label corresponds to the plurality of first training samples is whether a sample gas problem in the first label is same as an actual gas problem corresponding to the sample gas work order;
the training process of the problem model includes:
inputting the first training sample to an initial problem model;
constructing a loss function based on an output of the initial problem model with the first label; and
updating parameters of the initial problem model by the loss function until a trained initial problem model satisfies a first preset condition, wherein the first preset condition includes the loss function being less than a first threshold or converges and a training period reaching a second threshold;
determine, by the processor, a target gas problem of the gas work order based on the probability of occurrence; and
determine, by the processor, the reference reason of the target gas problem in a vector database based on the target gas problem;
determine, by the processor, a target processing scheme of the gas work order based on the at least one gas problem and the reference reason of the at least one gas problem, wherein to determine the target processing scheme of the gas work order based on the at least one gas problem and the reference reason of the at least one gas problem, the smart gas management platform is further configured to:

determine, by the processor, processing schemes corresponding to the target gas problem in the vector database based on the target gas problem, and form a recommended processing scheme; and generate, by the processor, the target processing scheme based on the recommended processing scheme;

send, by the processor, the target processing scheme to a user terminal of the executant of the gas work order;

in response to that a feedback of the user terminal satisfies a feedback preset condition, improve, by the processor, a risk level of the gas work order and providing an early warning notification, wherein the feedback refers to an evaluation of the executant for processing the target gas problem; and send, by the processor, the early warning notification to the user terminal through message push, to remind a gas manager to focus on the gas work order.

11. The Internet of Things system of claim 10, wherein the smart gas management platform is further configured to:

receive an execution feedback from the executant of the gas work order; and determine an updated target gas problem and an updated reference reason of the updated target gas problem based on the execution feedback.

12. The Internet of Things system of claim 10, wherein the smart gas management platform is further configured to:

determine the at least one candidate processing scheme for each gas problem based on the at least one gas problem and the reference reason of the at least one gas problem;

predict working hours required for each candidate processing scheme based on the at least one candidate processing scheme; and in response to that the working hours satisfy a preset condition of the working hours, determine the candidate processing scheme as the target processing scheme.

13. The Internet of Things system of claim 12, wherein the at least one candidate processing scheme is determined based on the vector database.

14. The Internet of Things system of claim 12, wherein the smart gas management platform is further configured to:

predict the working hours required for the each candidate through a working hour prediction model based on the at least one candidate processing scheme, wherein the working hour prediction model is a machine learning model.

15. The Internet of Things system of claim 12, wherein the smart gas management platform is further configured to:

in response to that the gas work order corresponds to a plurality of gas problems, predicting comprehensive working hours required to solve the plurality of gas problems.

16. The Internet of Things system of claim 15, wherein the smart gas management platform is further configured to:

predict the comprehensive working hours required to solve the plurality of gas problems through a working hour prediction model based on the plurality of gas problems and a correlation degree between the plurality of gas problems, wherein the working hour prediction model is a machine learning model.

17. A non-transitory computer-readable storage medium storing computer instructions, wherein when reading the computer instructions in the storage medium, a computer executes the method for processing the work order of the gas platform based on the smart gas operation of claim 1.

* * * * *